(12) United States Patent
Tsukada et al.

(10) Patent No.: US 9,197,875 B2
(45) Date of Patent: Nov. 24, 2015

(54) IMAGE PROCESSING DEVICE AND IMAGE PROCESSING METHOD

(75) Inventors: Takeshi Tsukada, Kanagawa (JP); Yoshikazu Komatsu, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 316 days.

(21) Appl. No.: 13/463,727

(22) Filed: May 3, 2012

(65) Prior Publication Data

US 2012/0301052 A1 Nov. 29, 2012

(30) Foreign Application Priority Data

May 27, 2011 (JP) .................................. 2011-119144

(51) Int. Cl.
*H04N 13/00* (2006.01)
*H04N 19/597* (2014.01)
*H04N 19/103* (2014.01)
*H04N 19/182* (2014.01)

(52) U.S. Cl.
CPC ......... *H04N 13/004* (2013.01); *H04N 13/0029* (2013.01); *H04N 13/0048* (2013.01); *H04N 19/103* (2014.11); *H04N 19/182* (2014.11); *H04N 19/597* (2014.11)

(58) Field of Classification Search
CPC ........................ H04N 2213/00; H04N 13/00
USPC ....................................................... 382/284
See application file for complete search history.

(56) References Cited

U.S. PATENT DOCUMENTS

| | | | | |
|---|---|---|---|---|
| 6,023,302 A | * | 2/2000 | MacInnis et al. | 348/597 |
| 6,037,953 A | * | 3/2000 | Mizutani | 345/563 |
| 6,507,358 B1 | | 1/2003 | Mori et al. | |
| 7,376,266 B2 | * | 5/2008 | Simard et al. | 382/166 |
| 7,483,042 B1 | * | 1/2009 | Glen | 345/629 |
| 2003/0090494 A1 | * | 5/2003 | Ohta | 345/611 |
| 2006/0028473 A1 | * | 2/2006 | Uyttendaele et al. | 345/473 |
| 2008/0303892 A1 | | 12/2008 | Kim et al. | |
| 2008/0303895 A1 | * | 12/2008 | Akka et al. | 348/49 |
| 2009/0262125 A1 | | 10/2009 | Swaminathan et al. | |
| 2009/0310947 A1 | | 12/2009 | Chillie | |
| 2010/0302235 A1 | * | 12/2010 | Darshan et al. | 345/419 |

(Continued)

FOREIGN PATENT DOCUMENTS

| | | |
|---|---|---|
| JP | H10 221644 A | 8/1998 |
| JP | 2003-324652 A | 11/2003 |

(Continued)

OTHER PUBLICATIONS

"Compositing Digital Images" Thomas Porter and Tom Duff, Computer Graphics, vol. 18, No. 3, Jul. 1984.*

(Continued)

*Primary Examiner* — Michelle Entezari
(74) *Attorney, Agent, or Firm* — McGinn IP Law Group, PLLC

(57) ABSTRACT

An image processing device and image processing method that are capable of generating a stereoscopic image with limited system resources. Mask information defines a display region so that substantially the same number of pixels in first image data and second image data are displayed while the pixels are dispersed substantially uniformly. A mixer unit references the mask information and mixes the first image data with the second image data to generate output image data, which is a stereoscopic image.

18 Claims, 16 Drawing Sheets

(56) References Cited

U.S. PATENT DOCUMENTS

| | | | |
|---|---|---|---|
| 2011/0187708 A1* | 8/2011 | Suzuki et al. | 345/419 |
| 2012/0098943 A1* | 4/2012 | Filippini et al. | 348/51 |
| 2012/0210217 A1* | 8/2012 | Abbas et al. | 715/716 |

FOREIGN PATENT DOCUMENTS

| | | | |
|---|---|---|---|
| JP | 2004 166195 A | 6/2004 | |
| JP | 2009 258726 A | 11/2009 | |
| JP | 2010 026021 A | 2/2010 | |
| JP | 2010-068399 A | 3/2010 | |
| JP | 2010 246033 A | 10/2010 | |
| WO | WO 90/13848 A1 | 11/1990 | |
| WO | WO 2010/011557 A2 | 1/2010 | |

OTHER PUBLICATIONS

"Data Broadcast Encoding Method and Transmission Method in Digital Broadcasting" (retrieved from the Internet on Apr. 10, 2011; URL:http//www.arib.or.jp/english/html/overview/doc/2-STD-B24v5_1-1p3.pdf).

Japanese Office action dated Sep. 9, 2014 and an English Translation thereof.

Chinese Office Action dated Nov. 3, 2014 with English Translation thereof.

European Search Report dated May 19, 2015.

Chinese Office Action dated Jun. 12, 2015 with an English translation.

* cited by examiner

| (327) | 0 | | | 1 | | |
|---|---|---|---|---|---|---|
| (326)/(317) | 0 | 1 | (326)/(317) | 0 | 1 |
| | 0 | 0 | 0 | 0 | 0 | 0 |
| | 1 | 1 | 1 | 1 | 1 | 1 |

IMAGE PROCESSING DEVICE AND IMAGE PROCESSING METHOD

CROSS-REFERENCE TO RELATED APPLICATIONS

The disclosure of Japanese Patent Application No. 2011-119144 filed on May 27, 2011 including the specification, drawings, and abstract is incorporated herein by reference in its entirety.

BACKGROUND

The present invention relates to an image processing device and an image processing method.

In recent years, it is highly necessary that personal computers, gaming devices, digital-broadcast-ready television sets, Blu-ray recorders, and other digital home appliances have a three-dimensional (3D) capability. More specifically, it is necessary that these devices accept an input 3D image and properly display the 3D image.

The 3D image input format for the above-mentioned devices has been diversified. The 3D image output format for the devices has also been diversified. In consideration of the diversified 3D image input/output format, some models of television devices having a 3D image display capability have newly incorporated various 3D signal processing functions in addition to a 3D image display function compliant with an existing digital broadcast standard. However, these models have entailed increased cost, including the cost of development and manufacture and the cost of overall system, because they have special functions such as the 3D signal processing functions.

A method of generating a 3D stereoscopic image, which is to be input into a display functionality of the above devices, is disclosed in US Patent Publication No. 2010/0302235. The method disclosed in US Patent Publication No. 2010/0302235 uses a pixel blender (synthesis means), such as a GPU (Graphics Processing Unit), to generate a 3D stereoscopic image from plural images (two images in most cases) and mask information.

FIG. 15 is a diagram illustrating a method of generating a 3D stereoscopic image in a 3D television system described in US Patent Publication No. 2010/0302235. A method of generating a 3D stereoscopic image 53 from a left eye image 51 and a right eye image 52 is described below. The 3D stereoscopic image 53 is structured so that the pixel values of pixels included in the left eye image are set for pixels in odd-numbered lines while the pixel values of pixels included in the right eye image are set for pixels in even-numbered lines.

The method described in US Patent Publication No. 2010/0302235 uses pixel blenders 60, 61, which are operated by a CPU or GPU. The pixel blender 61 reads the left eye image 51 and mask information 54 from a storage device such as a RAM (Random Access Memory). The pixel blender 60 performs a process defined by Porter-Duff's "A atop B" rule. More specifically, the pixel blender 60 sets the pixel value of a pixel in the corresponding position of the left eye image 51 for a pixel for which the value "1" is designated in the mask information 54. The pixel blender 60 does not set a pixel value for a pixel for which the value "0" is designated in the mask information 54. The pixel blender 60 generates an intermediate image 55 by performing the above-described process for all pixels. The pixel blender 60 writes the generated intermediate image 55 in the storage device such as a RAM.

The pixel blender 61 reads the right eye image 52 and the intermediate image 55 from the storage device such as a RAM. The pixel blender 61 performs a process defined by Porter-Duff's "A over B" rule. More specifically, the pixel blender 61 sets the pixel value of a pixel in the corresponding position of the right eye image 52 for a pixel for which the value "0" is designated in the intermediate image 55. The pixel blender 61 does not perform the process for a pixel for which the pixel value derived from the left eye image is already set. The pixel blender 61 generates an output image 53 by performing the above-described process for all pixels. The pixel blender 61 writes the generated output image 53 in the storage device such as a RAM.

FIG. 16 is a diagram illustrating the relationship between each process and memory access (access to the storage device) that occurs when the method described in US Patent Publication No. 2010/0302235 is used. The pixel blender 60 performs a process of reading the storage device three times. The pixel blender 61 performs a process of reading the storage device two times. The pixel blenders 60, 61 perform a process of writing into the storage device once. Further, another processing unit performs a process of reading the output image 53 from the storage device once.

Plane synthesis, which is described in "Data Broadcast Encoding Method and Transmission Method in Digital Broadcasting" (retrieved from the Internet on Apr. 10, 2011; URL: http//www.arib.or.jp/english/html/overview/doc/2-STD-B24v5_1-1p3.pdf), is suggested in Japanese Unexamined Patent Publications No. 2003-324652 and 2010-068399. A plane synthesis technology described in "Data Broadcast Encoding Method and Transmission Method in Digital Broadcasting" will now be described with reference to FIG. 17. The plane synthesis technology defines the plane synthesis for digital broadcasting.

FIG. 17 is a schematic diagram illustrating the digital broadcast plane synthesis technology described in "Data Broadcast Encoding Method and Transmission Method in Digital Broadcasting". The term "plane" refers to a display screen for displaying mono-media (independent expression media such as video, audio, text, and still images).

A mixer unit 70 reads still image data 81 from a RAM 80 as video/still plane 0 (91). The mixer unit 70 reads moving image data 82 from the RAM 80 as video/still plane 1 (92). Video/still plane 0 (91) and video/still plane 1 (92) may be either a moving image or a still image.

Similarly, the mixer unit 70 reads text data 84 from the RAM 80 as a subtitle plane 94. The mixer unit 70 reads text/graphic data 85 from the RAM 80 as a text/graphic plane 95. Digital broadcast requirements prescribe that five planes be handled as shown in FIG. 17. However, a lager number of planes may be handled. For example, a plane for displaying a user's operating menu and a plane for displaying a cursor may be additionally handled.

The mixer unit 70 reads a switching plane 83 from the RAM 80. As regards the switching plane 83, the setup for a transparentizing process is defined for a situation where two planes (video/still plane 0 (91) and video/still plane 1 (92) in the current example) are synthesized. As for the switching plane 83, 1-bit data is set for each pixel. The 1-bit data is either a value ("0") indicating the setup of a pixel value for video/still plane 0 (91) or a value ("1") indicating the setup of a pixel value for video/still plane 1 (92).

The mixer unit 70 can independently set a scaling ratio for video/still plane 0 (91) and video/still plane 1 (92). In other words, the mixer unit 70 can individually enlarge or reduce video/still plane 0 (91) and video/still plane 1 (92) while keeping them independent of each other.

The mixer unit 70 reduces video/still plane 9 (91) in accordance with a region defined by the switching plane 83 (video/ still plane 9 (91) in FIG. 17 is reduced to ½). Further, the mixer unit 70 examines a bit value that is set for each pixel of the switching plane 83. If the value "0" is set as the bit value for a particular pixel, the mixer unit 70 operates so that the pixel value of a target pixel of video/still plane 0 (91) is set for the particular pixel. If, on the other hand, the value "1" is set as the bit value for a particular pixel, the mixer unit 70 operates so that the pixel value of a target pixel of video/still plane 1 (92) is set for the particular pixel. In this manner, the mixer unit 70 generates an intermediate image (not shown) that is a combination of video/still plane 0 (91) and video/still plane 1 (92).

The mixer unit 70 superimposes the subtitle plane 94 and the text/graphic plane 95 over the intermediate image to generate an output image 96.

Although "Data Broadcast Encoding Method and Transmission Method in Digital Broadcasting" suggests and teaches the digital broadcast plane synthesis technology, it does not describe the generation of a stereoscopic image at all.

SUMMARY

As indicated in FIG. 16, the method described in US Patent Publication No. 2010/0302235 needs to read a storage device multiple times in order to generate the intermediate image 55 and the output image 53. This method also needs to write the intermediate image 55 and the output image 53 into the storage device. This not only increases the amount of system resources required to acquire the output image 53, such as the required memory capacity, memory bandwidth, and processing time, but also increases overall power consumption. This problem is evident particularly when the method described in US Patent Publication No. 2010/0302235 is used to generate a stereoscopic image from a high-resolution moving image.

According to one aspect of the present invention, there is provided an image processing device including a mixer unit. The mixer unit mixes a first image with a second image to generate an output image in accordance with first mask information, which defines a display region so that substantially the same number of pixels in the first and second images are displayed while the pixels are dispersed substantially uniformly.

According to another aspect of the present invention, there is provided an image processing method including the step of mixing a first image with a second image to generate a stereoscopic output image in accordance with first mask information, which defines a display region so that substantially the same number of pixels in the first and second images are displayed while the pixels are dispersed substantially uniformly.

According to an aspect of the present invention, the mask information prescribes that substantially the same number of pixels in the first and second images be uniformly disposed for stereoscopic viewing while the first image corresponds to one eye of a user and the second image corresponds to the other eye. The mixer unit uses the mask information to mix the first image with the second image for the purpose of generating a stereoscopic image. In this instance, the mixer unit can generate the stereoscopic image without creating an intermediate image.

The present invention makes it possible to provide an image processing device and image processing method that are capable of generating a stereoscopic image with limited system resources.

BRIEF DESCRIPTION OF THE DRAWINGS

Embodiments of the present invention will be described in detail based on the following figures, in which.

DETAILED DESCRIPTION

First Embodiment

Figure 1:
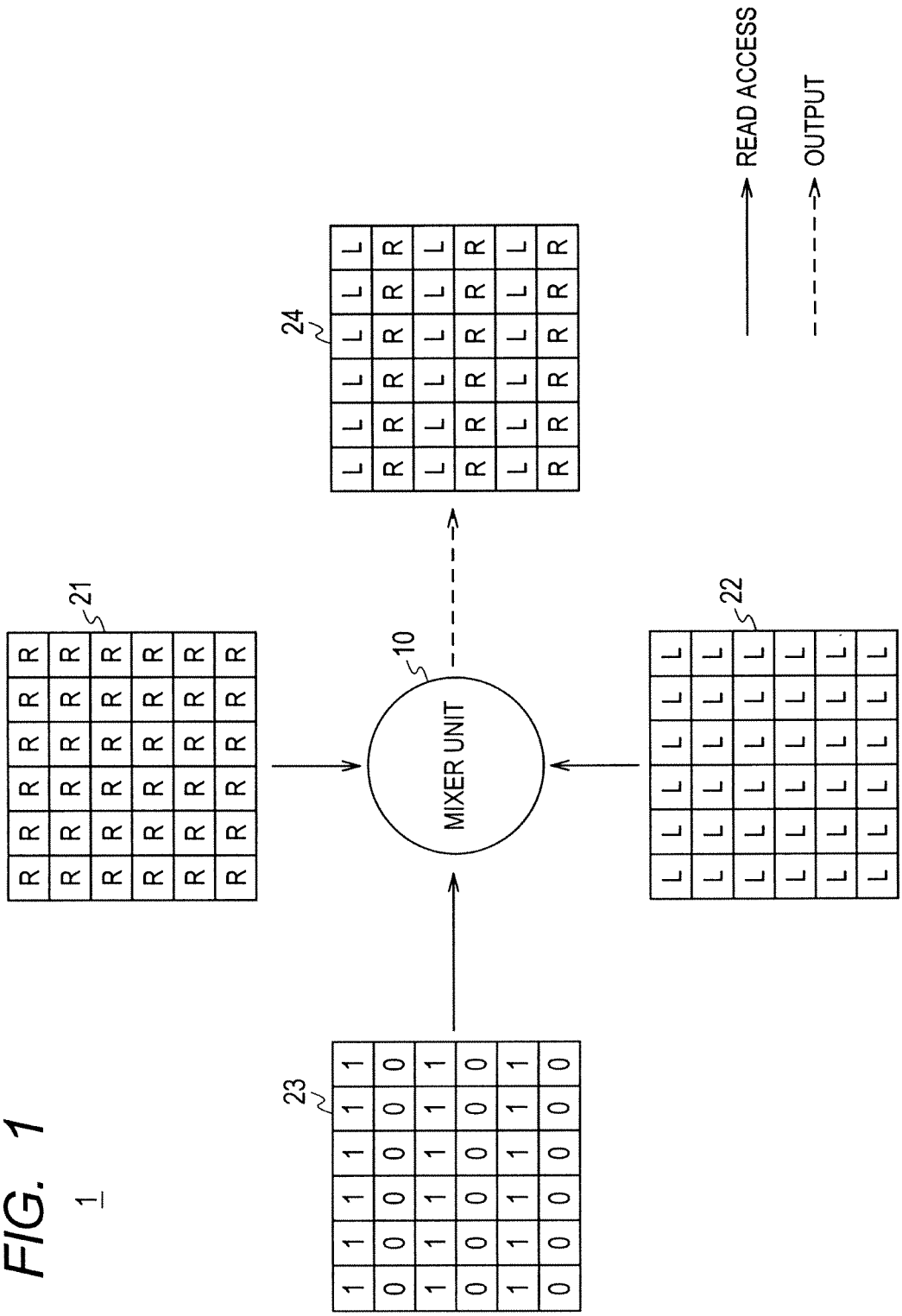
FIG. 1 is a block diagram illustrating the configuration of an image processing device according to a first embodiment of the present invention.

A first embodiment of the present invention will now be described with reference to the accompanying drawings. FIG. 1 is a block diagram illustrating the configuration of an image processing device 1 according to the first embodiment. The image processing device 1 may be, for example, a television set, a set-top box, a digital signage device, a mobile phone having telephoning and gaming functions, and a projector.

The image processing device 1 includes a mixer unit 10 and a storage device (not shown). The storage device is a so-called memory such as a RAM (Random Access Memory). The storage device need not always be mounted in the image processing device 1. For example, it may be a flash memory or other similar external device.

The mixer unit 10 accesses the storage device (not shown) and reads first image data 21, which is a moving image or a still image, and second image data 22, which is a moving image or a still image. The first image data 21 is an image corresponding to a user's right eye in a stereoscopic image. The second image data 22 is an image corresponding to a user's left eye in the stereoscopic image. The mixer unit 10 also reads mask information 23 from the storage device. The mask information 23 defines a display region of the first image data 21 and of the second image data 22.

The mask information 23 defines a range within which the pixel value of each pixel included in the first image data 21 is used to generate a stereoscopic image and a range within which the pixel value of each pixel included in the second image data 22 is used to generate the stereoscopic image. The mask information 23 has the same number of pixels as the first image data 21 and the second image data 22.

For each pixel included in the mask information 23, either the bit value "0" or the bit value "1" is set. The bit value "0" indicates that the first image data 21 is to be displayed. The bit value "1" indicates that the second image data 22 is to be displayed. In the mask information 23, the number of pixels for which the bit value "0" is set is substantially, or preferably exactly, equal to the number of pixels for which the bit value "1" is set.

When the pixels for which the bit value "0" is set and the pixels for which the bit value "1" is set are disposed in the mask information 23, they are dispersed substantially uniformly. In the mask information 23 shown, for instance, in FIG. 1, the pixels for which the bit value "0" is set and the pixels for which the bit value "1" is set are alternately disposed in each column. In other words, the mask information 23 shown in FIG. 1 is configured so that the bit values are disposed in a horizontal stripe pattern (line alternate).

The mixer unit 10 is a processing unit that generates output image data 24 by using the first image data 21, the second image data 22, and the mask information 23. In the present embodiment, the output image data 24 is stereoscopic image data. The mixer unit 10 reads the first image data 21, the second image data 21, and the mask information 23 from the storage device and outputs the output image data 24.

Figure 2:
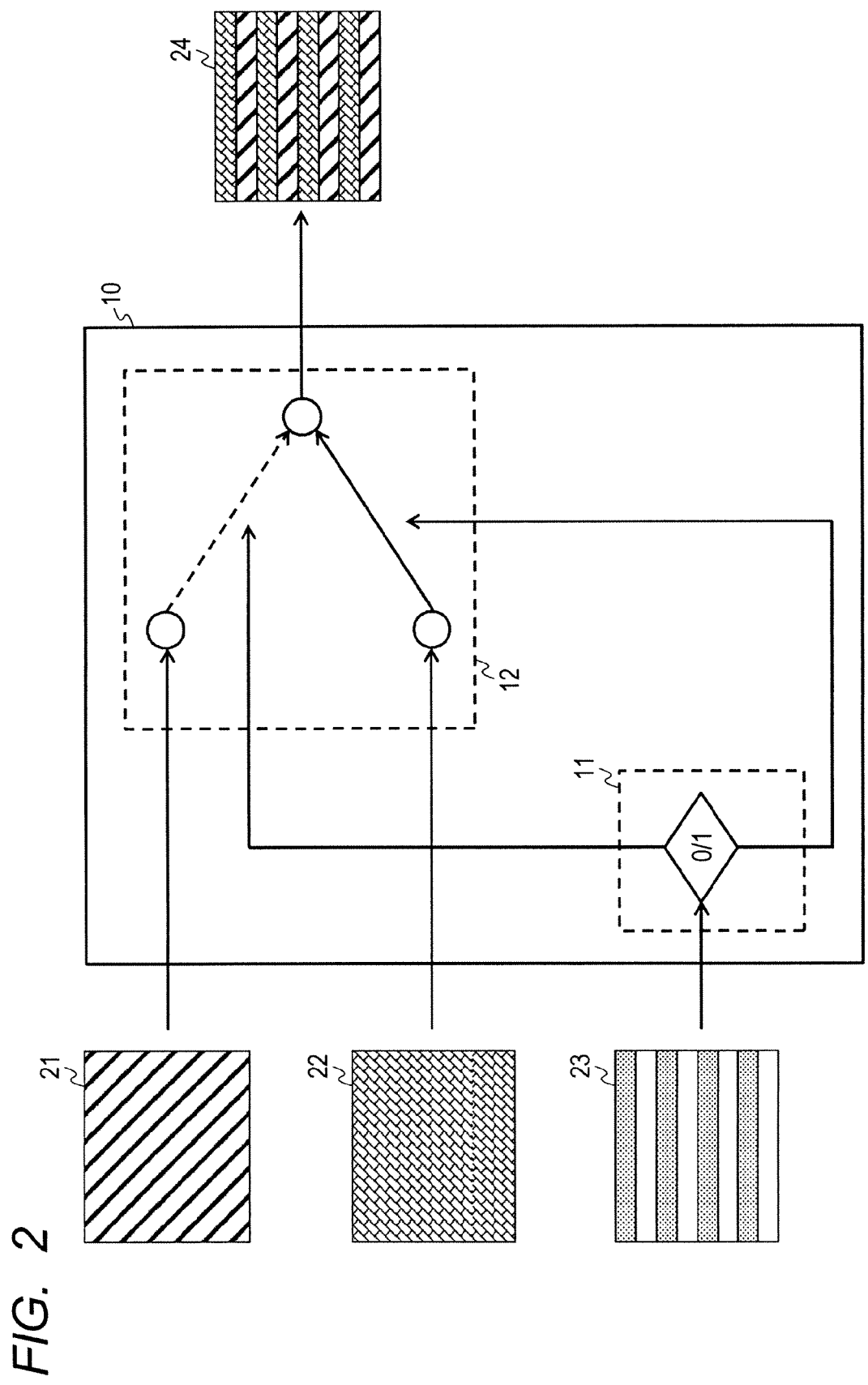
FIG. 2 is a block diagram illustrating the details of a mixer unit according to the first embodiment.

FIG. 2 is a block diagram illustrating the details of the mixer unit 10. The mixer unit 10 includes a selection signal output unit 11 and a switch unit 12.

The selection signal output unit 11 reads a bit value from the mask information 23 on an individual pixel basis. When the read bit value is "0", the selection signal output unit 11 outputs a signal for selecting the pixel value of the first image data 21 (image corresponding to the right eye) at relevant coordinates to the switch unit 12. When the read bit value is "1", the selection signal output unit 11 outputs a signal for selecting the pixel value of the second image data 22 (image corresponding to the left eye) at relevant coordinates to the switch unit 12. More specifically, a selection signal output from the selection signal output unit 11 includes information about coordinates and information for specifying the pixel value to be set at the coordinates.

The switch unit 12 reads a pixel value from relevant coordinates of the first image data 21 or the second image data 22 in accordance with the selection signal supplied from the selection signal output unit 11. Further, the switch unit 12 sets the read pixel value at the relevant coordinates of the output image data 24.

The selection signal output unit 11 and the switch unit 12 perform the above-described processes for all pixels included in the mask information 23. This causes the mixer unit 10 to generate a stereoscopic image 24.

Figure 3:
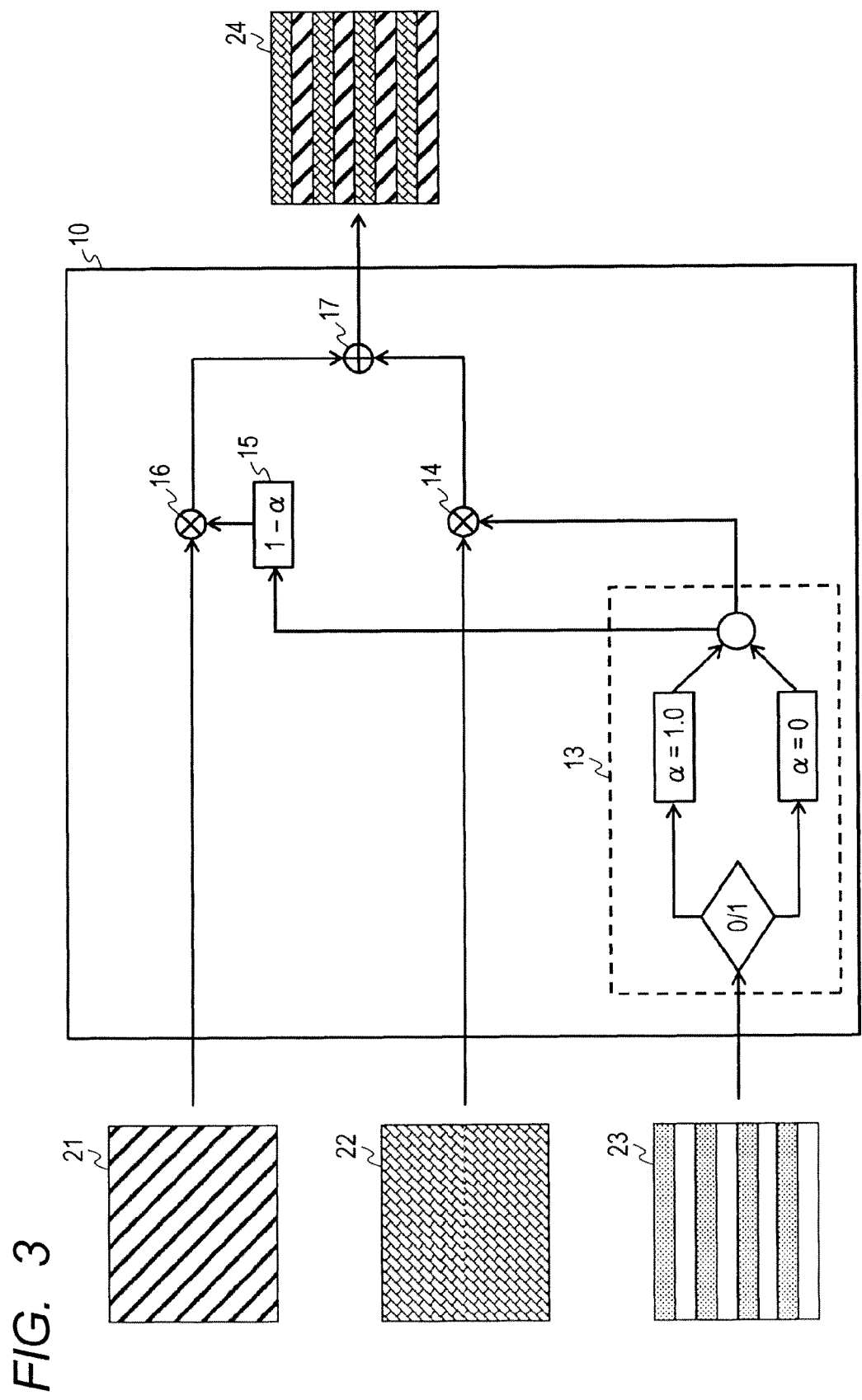
FIG. 3 is another block diagram illustrating the details of the mixer unit according to the first embodiment.

The mixer unit 10 may alternatively be configured as shown in FIG. 3. FIG. 3 is a block diagram illustrating an alternative configuration of the mixer unit 10. The mixer unit 10 includes an alpha blend value calculation unit 13, a multiplication unit 14, a subtraction unit 15, multiplication unit 16, and an addition unit 17.

The alpha blend value calculation unit 13 reads a bit value from the mask information 23 on an individual pixel basis. When the read bit value is "0", the alpha blend value calculation unit 13 sets an alpha blend value at relevant coordinates to "0". When the read bit value is "1", the alpha blend value calculation unit 13 sets the alpha blend value at the relevant coordinates to "1". The alpha blend value calculation unit 13 notifies the multiplication unit 14 and subtraction unit 15 of the set alpha blend value and the information about the coordinates.

The multiplication unit 14 reads the pixel value at the relevant coordinates from the second image data 22. The multiplication unit 14 multiplies the read pixel value by the alpha blend value. The multiplication unit 14 supplies the result of multiplication to the addition unit 17.

The subtraction unit 15 subtracts the supplied alpha blend value from 1 and supplies the result of subtraction (1−α) to the multiplication unit 16. The multiplication unit 16 reads the pixel value of the relevant coordinates from the first image data 21. The multiplication unit 16 multiplies the read pixel value by the alpha blend value that is supplied from the subtraction unit 15 as the result of subtraction. The multiplication unit 16 supplies the result of multiplication to the addition unit 17.

The addition unit 17 adds the pixel value supplied from the multiplication unit 14 to the pixel value supplied from the multiplication unit 16, and sets the result of addition as the pixel value at the relevant coordinates.

Each processing unit (alpha blend value calculation unit 13, multiplication unit 14, subtraction unit 15, multiplication unit 16, and addition unit 17) included in the mixer unit 10 sets the above-described pixel value for all pixels included in the mask information 23. This causes the mixer unit 10 to generate a stereoscopic image 24.

The array of bits in the mask information 23 (the array of pixels for which the bit value "0" is set and of pixels for which the bit value "1" is set) is not limited to the horizontal stripe pattern shown in FIG. 1. Any bit array is acceptable as far as it is prescribed that substantially the same number of pixels in the first and second image data 21, 22 be dispersed substantially uniformly when they are displayed.

Figure 4:
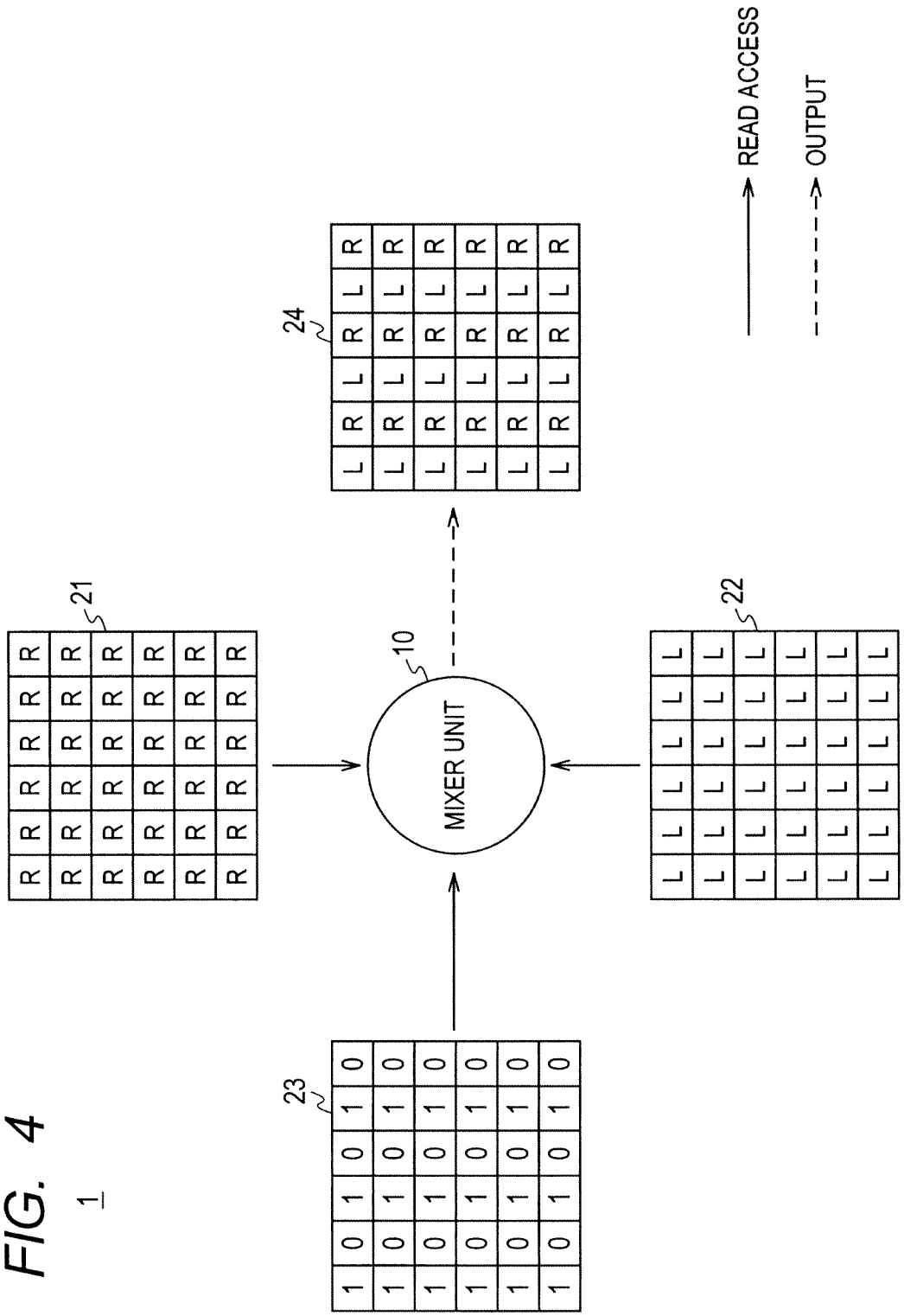
FIG. 4 is another block diagram illustrating the configuration of the image processing device according to the first embodiment.
Figure 5:
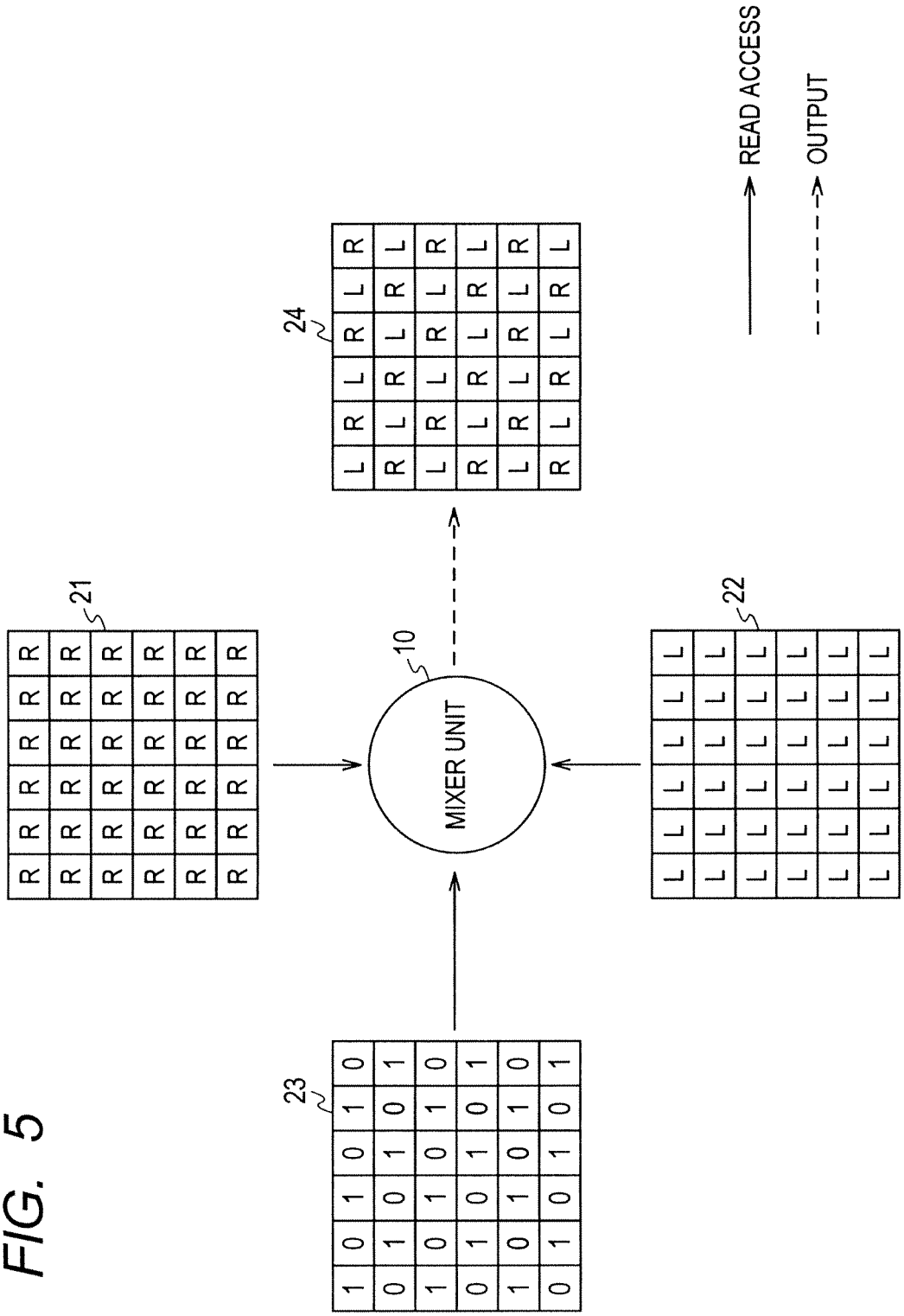
FIG. 5 is still another block diagram illustrating the configuration of the image processing device according to the first embodiment.

FIGS. 4 and 5 show other examples of the mask information 23. The example shown in FIG. 4 indicates that the bit array in the mask information 23 is a vertical stripe pattern (dot by dot). The example shown in FIG. 5 indicates that the bit array in the mask information 23 is a checkered pattern (checkerboard).

Figure 6:
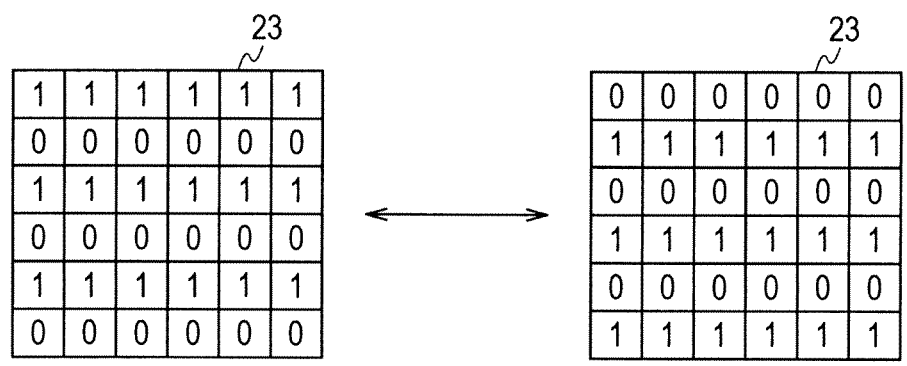
FIG. 6 is a diagram illustrating mask information according to the first embodiment.

The mixer unit 10 may use two different sets of mask information 23 alternately at fixed intervals. FIG. 6 shows two different sets of mask information 23. Two sets of mask information 23, which differ in the bit value position by one bit only, are prepared as shown in the figure. The mixer unit 10 uses the two sets of mask information 23 alternately at fixed intervals. For example, the mixer unit 10 may internally cache these sets of mask information 23 and switch between the cached sets of mask information 23 at fixed intervals. This ensures that the left-eye pixel position and right-eye pixel position change at fixed intervals without being definitely fixed. As the left-eye pixel position and right-eye pixel position change at fixed intervals, a stereoscopic image can be properly displayed even when, for instance, the image has a vertical stripe pattern.

Figure 7:
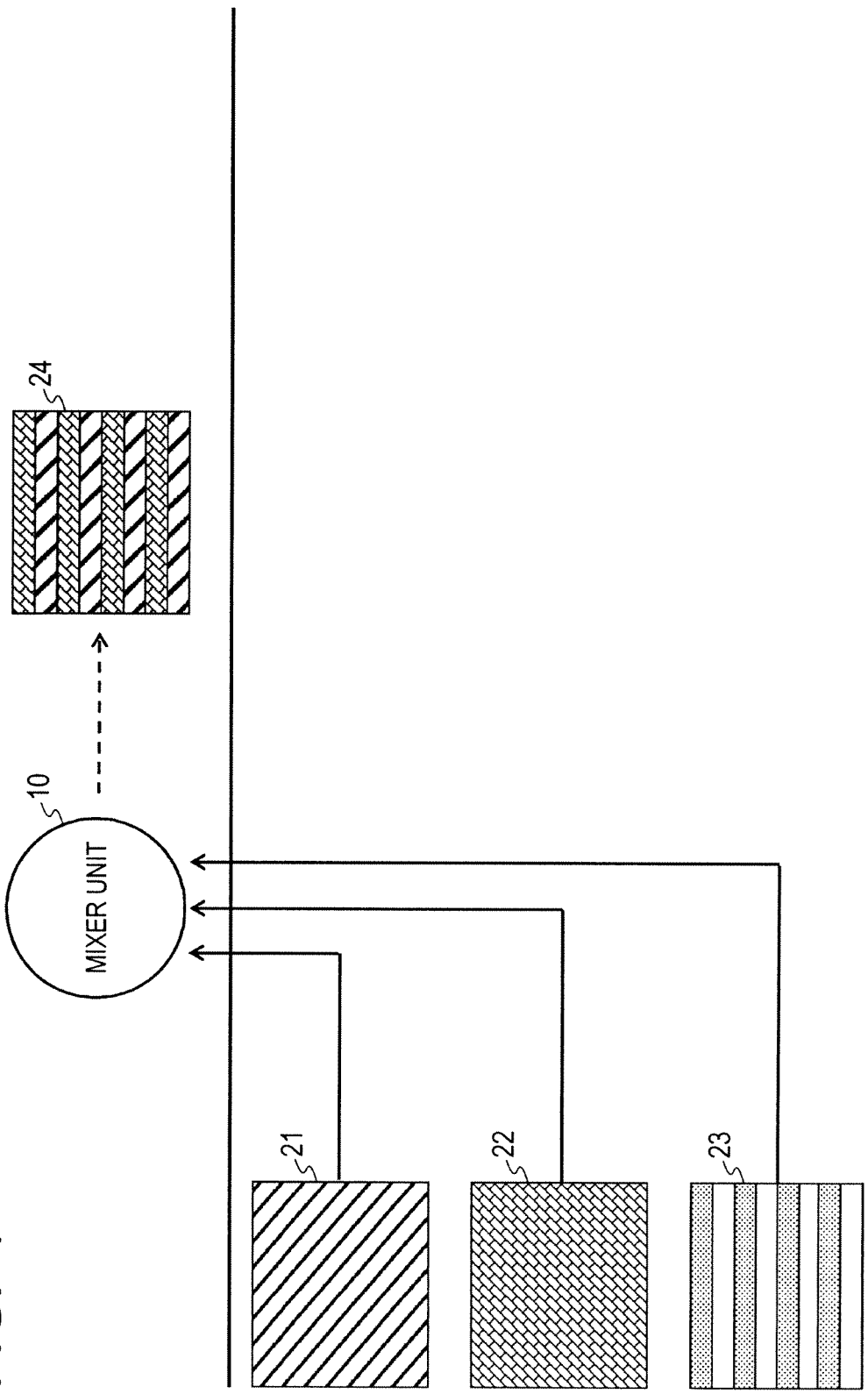
FIG. 7 is a diagram illustrating the relationship between an operation of the mixer unit according to the first embodiment and memory access (access to a storage device)

The relationship between an operation of the mixer unit 10 in the image processing device 1 and memory access (access to the storage device) will now be described. FIG. 7 is a diagram illustrating the relationship between the operation of the mixer unit 10 and memory access (access to the storage device).

As shown in the figure, the mixer unit 10 reads the first image data 21, the second image data 22, and the mask information 23 from the storage device. The mixer unit 10 then generates the output image data 24 in the earlier described manner from the read first image data 21, second image data 22, and mask information 23. The mixer unit 10 can directly supply the generated output image data 24 to any processing unit.

As described above, the mixer unit 10 reads data from the storage device three times to acquire display data. In this instance, the mixer unit 10 does not write data into the storage device.

Advantages provided by the image processing device 1 according to the present embodiment will now be described. As described above, the image processing device 1 according to the present embodiment generates the stereoscopic image 24 without generating an intermediate image. This eliminates the necessity of using an extra memory space for storing the intermediate image and acquiring a memory bandwidth for the intermediate image.

Further, as the image processing device generates the stereoscopic image 24 without generating the intermediate image, it can reduce the time required for processing. Furthermore, as the time required for processing is reduced, the image processing device 1 according to the present embodiment can reduce power consumption as compared to the method described in US Patent Publication No. 2010/0302235.

Second Embodiment

A second embodiment of the present invention will now be described. The image processing device according to the second embodiment not only performs a process of generating a stereoscopic image but also achieves a plane synthesis for digital broadcasting. The image processing device according to the present embodiment is described below.

Figure 8:
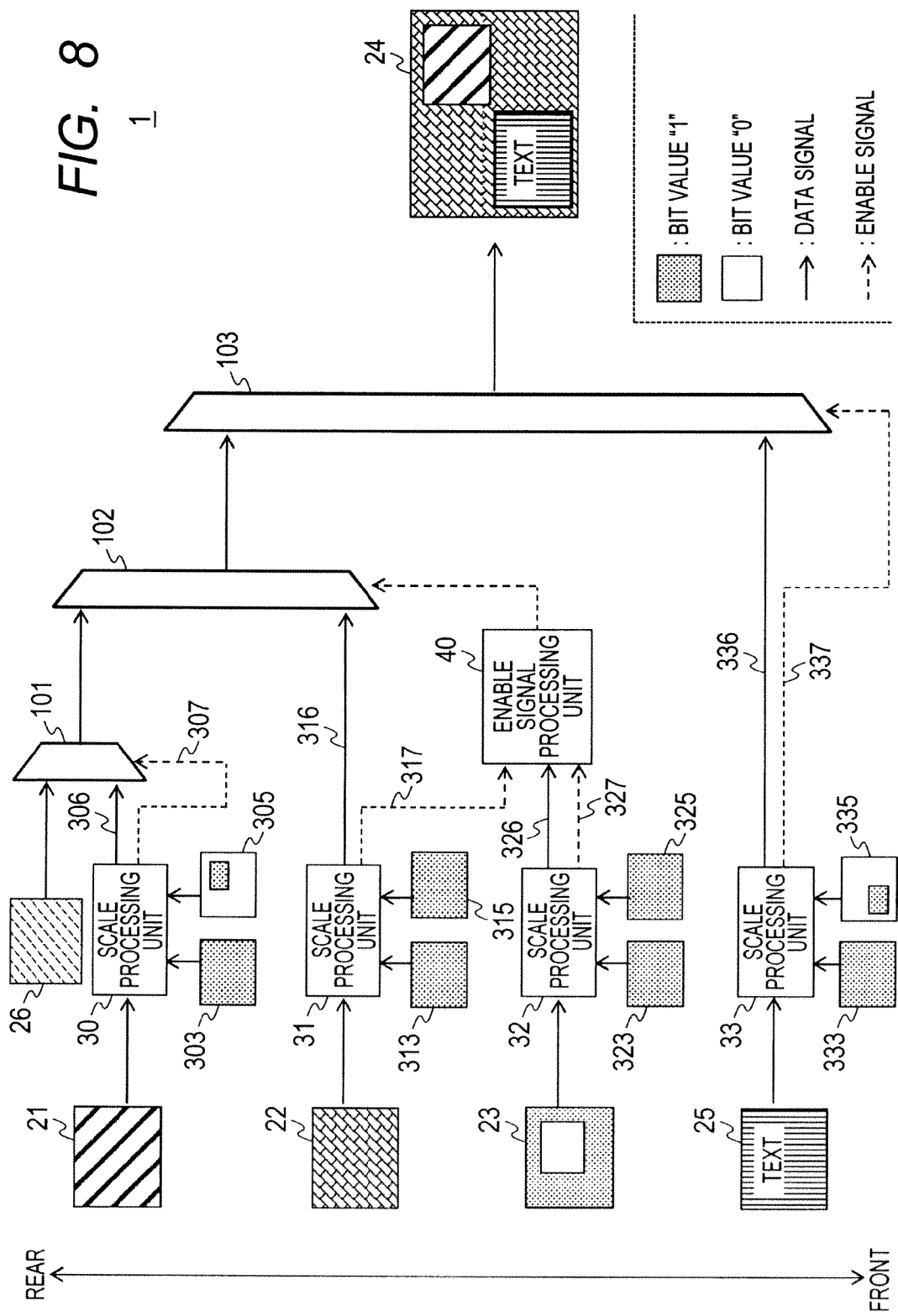
FIG. 8 is a block diagram illustrating the configuration of the image processing device according to a second embodiment of the present invention.

FIG. 8 is a block diagram illustrating the configuration of the image processing device according to the present embodiment. The image processing device 1 includes scale processing units 30-33, mixer units 101-103, and an enable signal processing unit 40.

FIG. 8 shows an example in which the image processing device 1 shown in the figure achieves a plane synthesis for digital broadcasting. The first image data 21 and the second image 22 are either a still image or a moving image. The mask information 23 corresponds to a so-called switching plane. Text/image data 25 corresponds to a text/graphic plane and a subtitle plane. The output image data 24, which is output from the image processing device 1, is a composite image that is obtained by placing the first and second image data 21, 22 in the background and placing the text/image data 25 in the foreground. An operation of each processing unit and a method of generating the output image data 24 are described below.

The scale processing unit 30 cuts out a necessary rectangle from the first image data 21, enlarges or reduces the rectangle to a predetermined size, and supplies the enlarged or reduced rectangular portion of the first image data 21 to the mixer unit 101. The scale processing unit 30 generates an enable signal for pixel value selection and supplies the enable signal to the mixer unit 101. The details of the scale processing unit 30 are described below with reference to FIG. 9.

The scale processing unit 30 includes a cutting unit 301 and an enlarging/reducing unit 302. The cutting unit 301 reads data selection information 303 from the storage device. The data selection information 303 indicates what pixels are to be cut out from the first image data 21. The data selection information 303 and the first image data 21 are equal in image size (in the number of vertical and horizontal pixels). Either the bit value "0" or the bit value "1" is set for each pixel in the data selection information 303. Pixels for which the bit value "1" is set are to be cut out. In other words, the data selection information 303 defines the display target region of the first image data 21.

The cutting unit 301 cuts out the region defined by the data selection information 303 from the first image data 21. The cutting unit 301 then supplies the cut-out image 304 to the enlarging/reducing unit 302.

The enlarging/reducing unit 302 reads display position information 305 from the storage device. The display position information 305 indicates a display region (display position and display size) within an output image 306 generated from the scale processing unit 30 in which the cut-out image 304 is to be displayed. In other words, the display position information 305 defines the scale of the cut-out image 304. The enlarging/reducing unit 302 enlarges or reduces the cut-out image 304 in accordance with the display position information 305 to generate the output image 306. In short, the output image 306 is processed first image data 21. Further, the enlarging/reducing unit 302 generates an enable signal 307 that indicates the effective region of the output image 306. The enable signal 307 has the same bit pattern as the display position information 305. The bit value (either "0" or "1") of each pixel included in the enable signal 307 is used for later-described pixel value selection in the mixer units 101-103. A 1-bit signal that corresponds to each pixel of the output image 306 and is used for pixel value selection as described above is referred to as the enable signal In reality, the cut-out image 304, the output image 306, and the enable signal 307 are exchanged as signals between the individual processing units. In other words, the cut-out image 304, the output image 306, and the enable signal 307 need not be written into the storage device.

Figure 9:
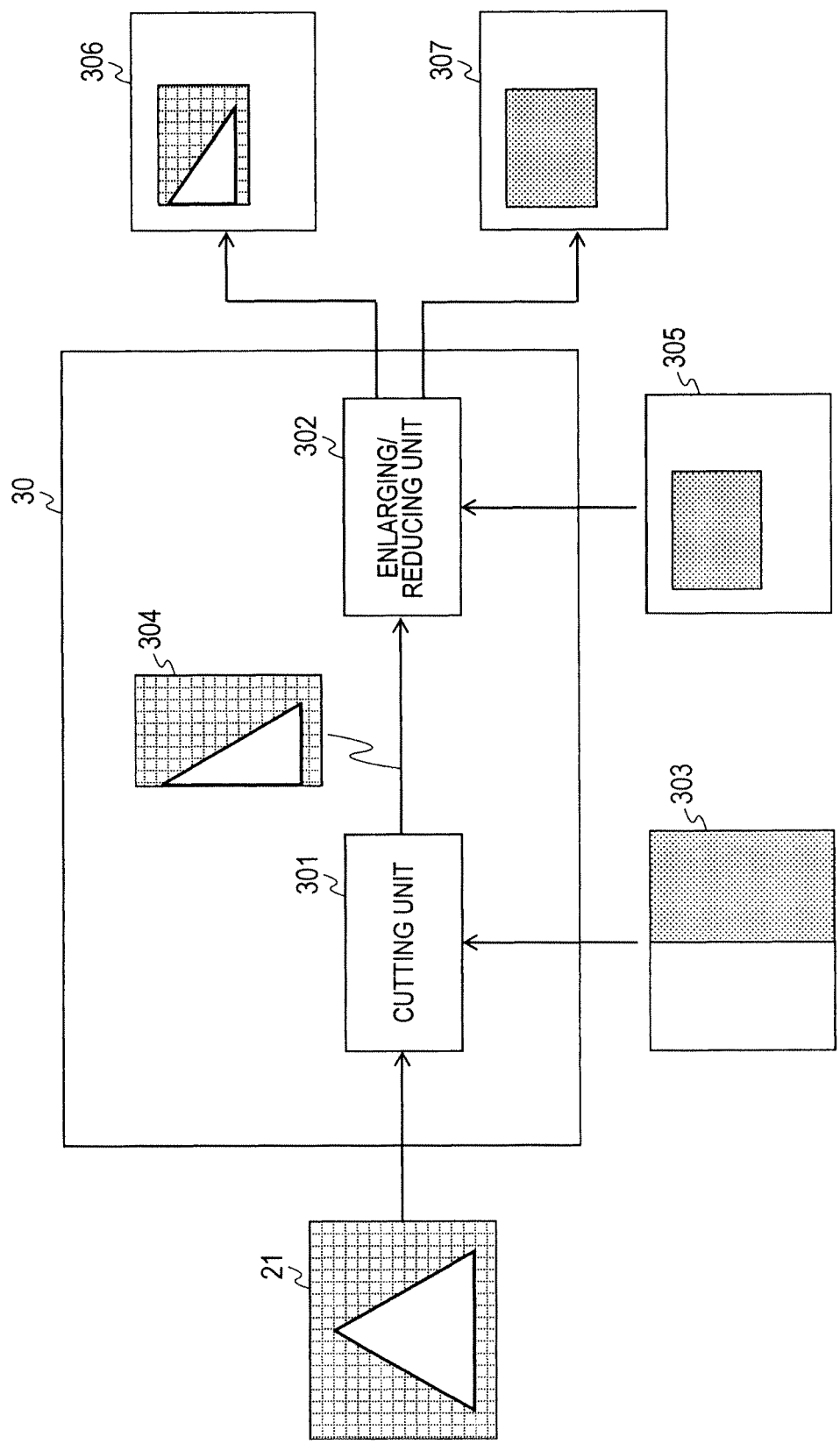
FIG. 9 is a block diagram illustrating the configuration of a scale processing unit according to the second embodiment.

Referring again to FIG. 8, the scale processing unit 31 uses data selection information 313 and display position information 315. The internal configuration of the scale processing unit 31 is the same as shown in FIG. 9. The scale processing unit 32 and the scale processing unit 33 are also configured as shown in FIG. 9. Display position information 325 concerning the mask information 23 can be interpreted as an effective region within which the mask information is effective.

The enable signal processing unit 40 generates an enable signal that is to be supplied to the mixer unit 102. The configuration of the enable signal processing unit 40 is described below with reference to FIG. 10.

The enable signal processing unit 40 includes a NAND gate 401 and an AND gate 402. An output image 326 and enable signal 327 are input into the NAND gate 401. As the mask information 23 corresponds to a switching plane, a bit value is set for each pixel. Therefore, each pixel of the output image 326 has either the bit value "0" or the bit value "1". In other words, either the bit value "0" or the bit value "1" is one input of the NAND gate 401.

The output of the NAND gate 401 and enable signal 317 are input into the AND gate 402. The AND gate 40 supplies a logical sum of these two inputs to the mixer unit 102.

Figures 10, 11:
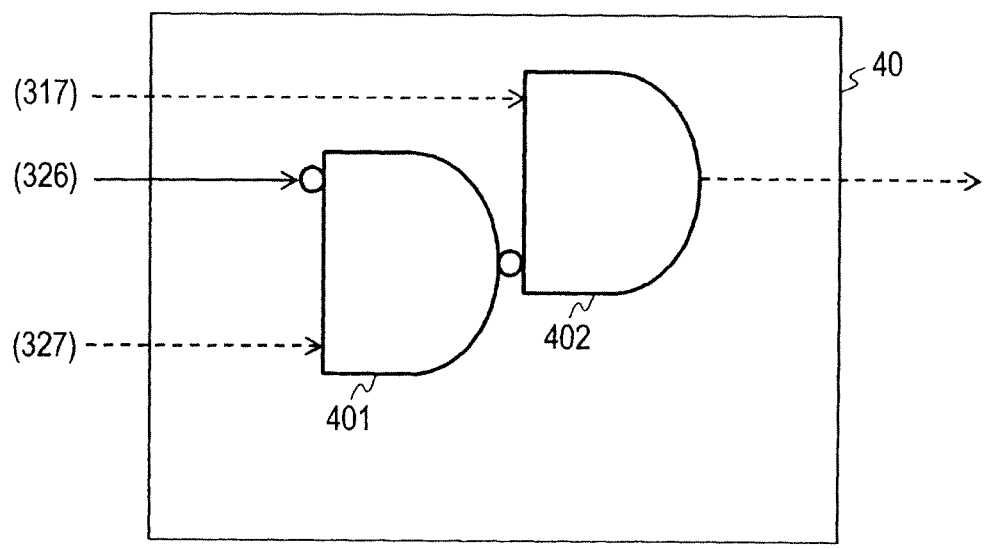
FIG. 10 is a block diagram illustrating the configuration of an enable signal processing unit according to the second embodiment.
FIG. 11 is a diagram illustrating the relationship between an input into and an output from the enable signal processing unit according to the second embodiment.

FIG. 11 is a diagram illustrating the relationship between an input into and an output from the enable signal processing unit 40. As shown in the figure, when the enable signal 327 is "0", the bit value of the enable signal 317 is output as an enable signal without regard to the bit value of the output image 326.

When the enable signal 327 is "1", the bit value of the output image 326 is "1". The bit value output as the enable signal is "1" only when the enable signal 327 is "1".

Referring back to FIG. 8, the mixer units 101-103 have the same configuration as the mixer unit shown in FIG. 2. The mixer unit 101 uses background information 26. The background information 26 is image data for which a predetermined plain color is designated, and need not be stored in the storage device.

When the bit value of the enable signal 307 is "0", the mixer unit 101 outputs the pixel value at relevant coordinates of the background information 26 as the pixel value at the relevant coordinates. When, on the other hand, the bit value of the enable signal 307 is "1", the mixer unit 101 outputs the pixel value at relevant coordinates of the output image 326, which is output from the scale processing unit 30, as the pixel value at the relevant coordinates.

In accordance with the enable signal output from the enable signal processing unit 40, the mixer unit 102 selects and outputs either a pixel value output from the mixer unit 101 or a pixel value output from the scale processing unit 31. When the enable signal output from the enable signal processing unit 40 is "0", the mixer unit 102 selects the pixel value output from the mixer unit 101 and outputs it to the mixer unit 103. When, on the other hand, the enable signal output from the enable signal processing unit 40 is "1", the mixer unit 102 selects the pixel value output from the scale processing unit 31 and outputs it to the mixer unit 103.

When the bit value of an enable signal 337 is "0", the mixer unit 103 selects a pixel value output from the mixer unit 102 and sets it as the pixel value of a relevant pixel of the output image data 24. When, on the other hand, the bit value of the enable signal 337 is "1", the mixer unit 103 selects a pixel value output from the scale processing unit 33 and sets it as the pixel value of the relevant pixel of the output image data 24.

The above description is given on the assumption that the mixer units 101-103 are configured as shown in FIG. 2. However, the present invention is not limited to such a mixer unit configuration. For example, the mixer units 101-103 may be configured to perform an alpha blend process as shown in FIG. 3.

Figure 12:
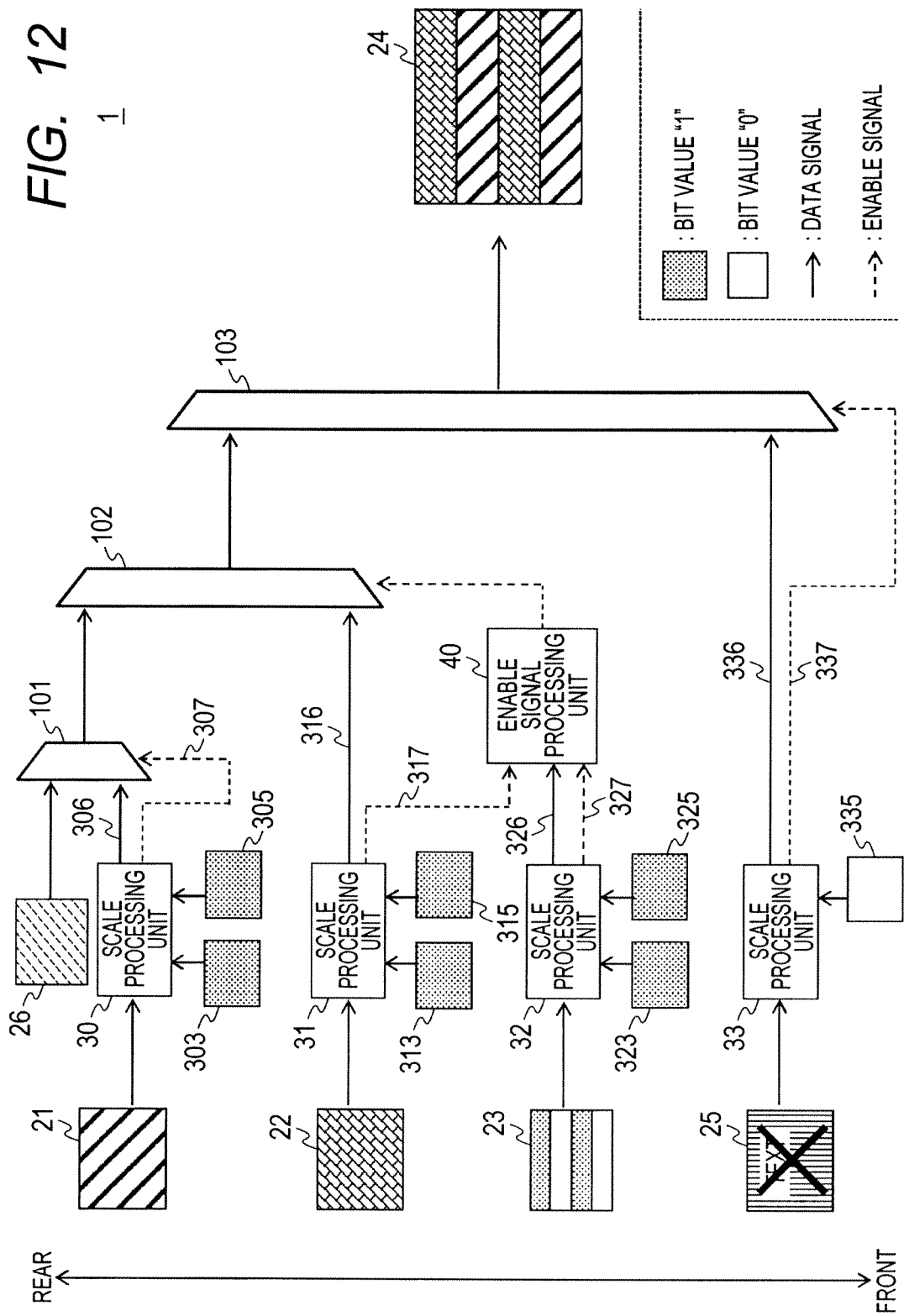
FIG. 12 is a diagram illustrating a stereoscopic image generation operation performed by the image processing device according to the second embodiment.

A method of generating stereoscopic image data when the image processing device 1 is configured as shown in FIG. 8 will now be described with reference to FIG. 12. In FIG. 12, the output image data 24 is stereoscopic image data. The image processing device shown in FIG. 12 has the same configuration as the image processing device 1 shown in FIG. 8. Processing units having the same name and reference numerals as those described earlier perform the earlier-described operations. When stereoscopic image data is to be generated, the first image data 21 is an image corresponding to the user's right eye whereas the second image data 22 is an image corresponding to the user's left eye.

When the stereoscopic image data is to be generated, the data selection information 303 designates the entire region of the first image data 21. The display position information 305 designates the entire region of the output image data 24. Similarly, the data selection information 313 designates the entire region of the second image data 22. The display position information 315 designates the entire region of the output image data 24. The mask information 23 has a bit array in a vertical stripe pattern as shown, for instance, in FIG. 1. The bit array of the mask information 23 is acceptable as far as substantially the same number of bit values are dispersed substantially uniformly. It may be in a horizontal stripe pattern or in a checkered pattern. Data selection information 323 designates the entire region of the mask information 23. The display position information 325 designates the entire region of the output image data 24. Display position information 335 is set so as not to select an image region (namely, the bit value "0" is set for all pixels).

Upon completion of the above input, the mixer unit 101 outputs the first image data 21 that is rescaled to the same size as the output image data 24. The mixer unit 102 outputs the second image data 22 that is rescaled to the same size as the output image data 24.

The enable signal processing unit 40 outputs an enable signal as shown in FIG. 11. When the display position information 305 and the display position information 315 are set as described above, the enable signals 317, 327 are always "1". Therefore, for a pixel for which the bit value "1" is set in the mask information 23, the enable signal processing unit 40 outputs the bit value "1" as an enable signal. On the other hand, for a pixel for which the bit value "0" is set in the mask information 23, the enable signal processing unit 40 outputs the bit value "0" as an enable signal.

Consequently, the mixer unit 102 generates stereoscopic image data. As the display position information 305 is set so as not to select an image region, the mixer unit 103 directly sets a signal input from the mixer unit 102 as the pixel value for the output image data 24.

In the above description, it is assumed that the scale processing units 30-33 include an enlarging/reducing unit. However, the enlarging/reducing unit may be omitted if the input data (first image data 21, second image data 22, mask information 23, etc.) has the same image size as the output image data 24.

The above-mentioned mixer unit 102 mixes the rescaled first image data 21 with the rescaled second image data 22 by using an enable signal generated in accordance with the mask information 23. The mixer unit 102 generates stereoscopic image data by performing the above mixing operation. It means that the mixer unit 102 has substantially the same role as the mixer unit 10 shown in FIG. 2.

Figure 13:
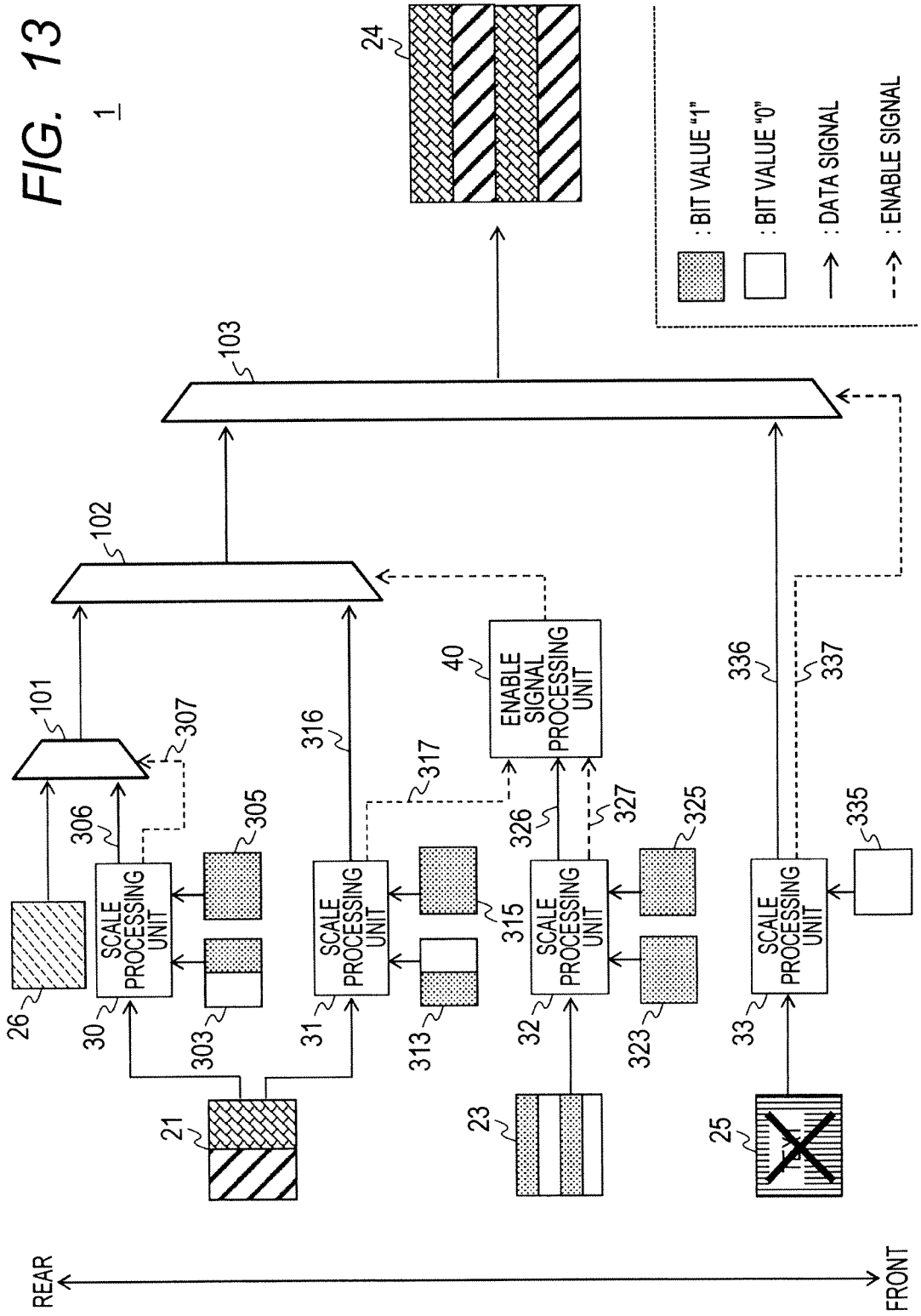
FIG. 13 is a diagram illustrating a stereoscopic image data generation operation that is performed by the image processing device according to the second embodiment when side-by-side image data is input.

A method of generating stereoscopic image data by inputting side-by-side image data when the image processing device 1 is configured as shown in FIG. 8 will now be described with reference to FIG. 13.

The first image data 21 is structured so that the left half of its region is an image corresponding to the user's right eye, and that the right half of its region is an image corresponding to the user's left eye. The data selection information 303 designates the right half region of the first image data 21 (sets the bit value "1" for each pixel in the right half region). The display position information 305 designates the entire region of the output image data 24. The data selection information 313 designates the left half region of the first image data 21 (sets the bit value "1" for each pixel in the left half region). The display position information 315 designates the entire region of the output image data 24. The mask information 23 has a bit array in a horizontal stripe pattern as shown, for instance, in FIG. 1. The data selection information 323 designates the entire region of the mask information 23. The display position information 325 designates the entire region of the output image data 24. The display position information 335 is set so as not to select an image region (namely, the bit value "0" is set for all pixels).

In accordance with the above input, the scale processing unit 30 outputs an image that is obtained by enlarging the right half region of the first image data to the data size of the output image data 24 (outputs, actually, the pixel value of each pixel included in the image). The mixer unit 101 outputs the image output from the scale processing unit 30 on an "as is" basis.

In accordance with the above input, the scale processing unit 31 outputs an image that is obtained by enlarging the left half region of the first image data to the data size of the output image data 24 (outputs, actually, the pixel value of each pixel included in the image).

As is the case shown in FIG. 12, the enable signal processing unit 40 outputs the bit value "1" as an enable signal for a pixel for which the bit value "1" is set in the mask information 23. For a pixel for which the bit value "0" is set in the mask information 23, on the other hand, the enable signal processing unit 40 outputs the bit value "0" as an enable signal.

The operations of the mixer units 102, 103 are the same as indicated in FIG. 12 and will not be described in detail.

Figure 14:
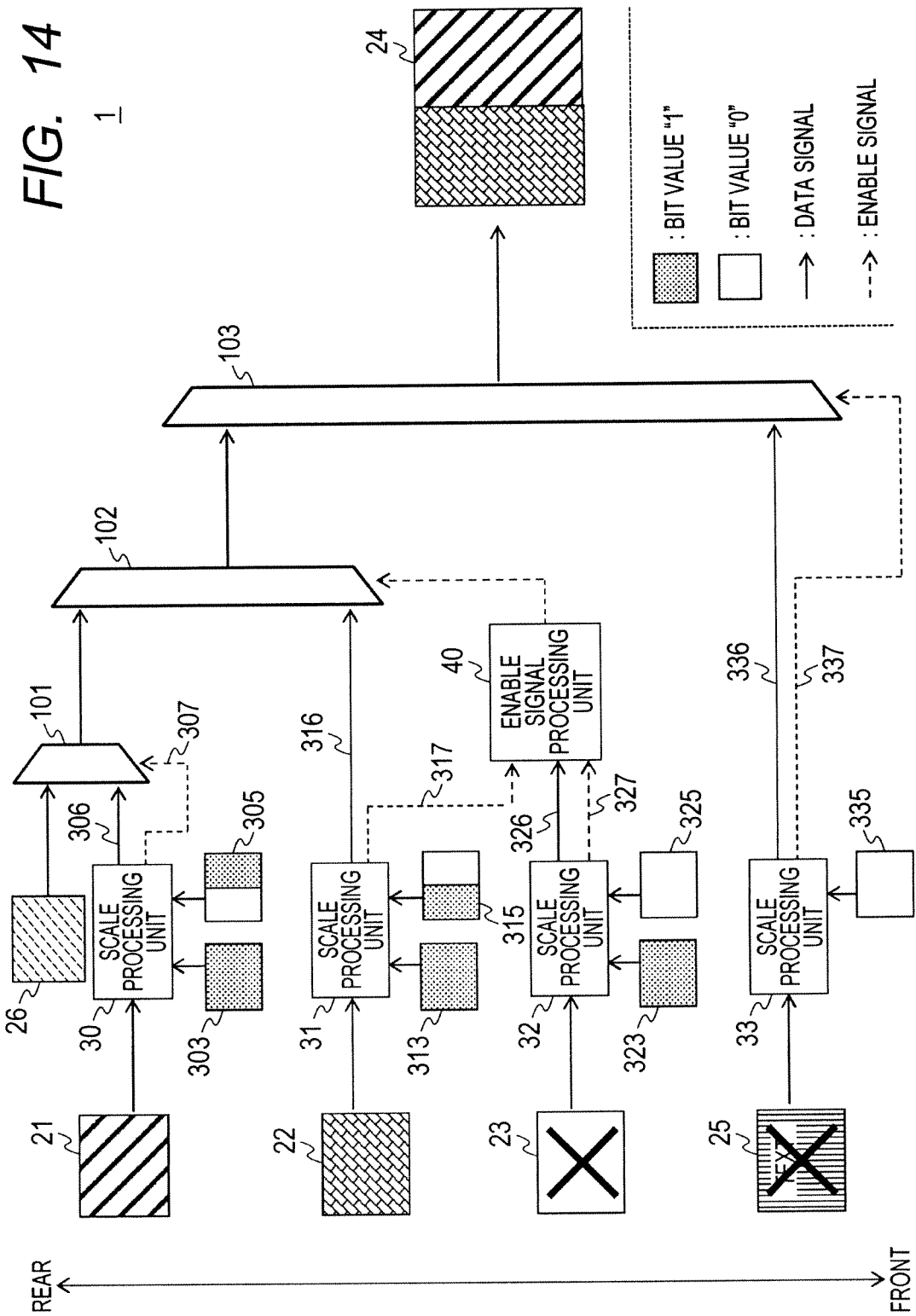
FIG. 14 is a diagram illustrating a side-by-side image data generation operation performed by the image processing device according to the second embodiment.
Figure 15:
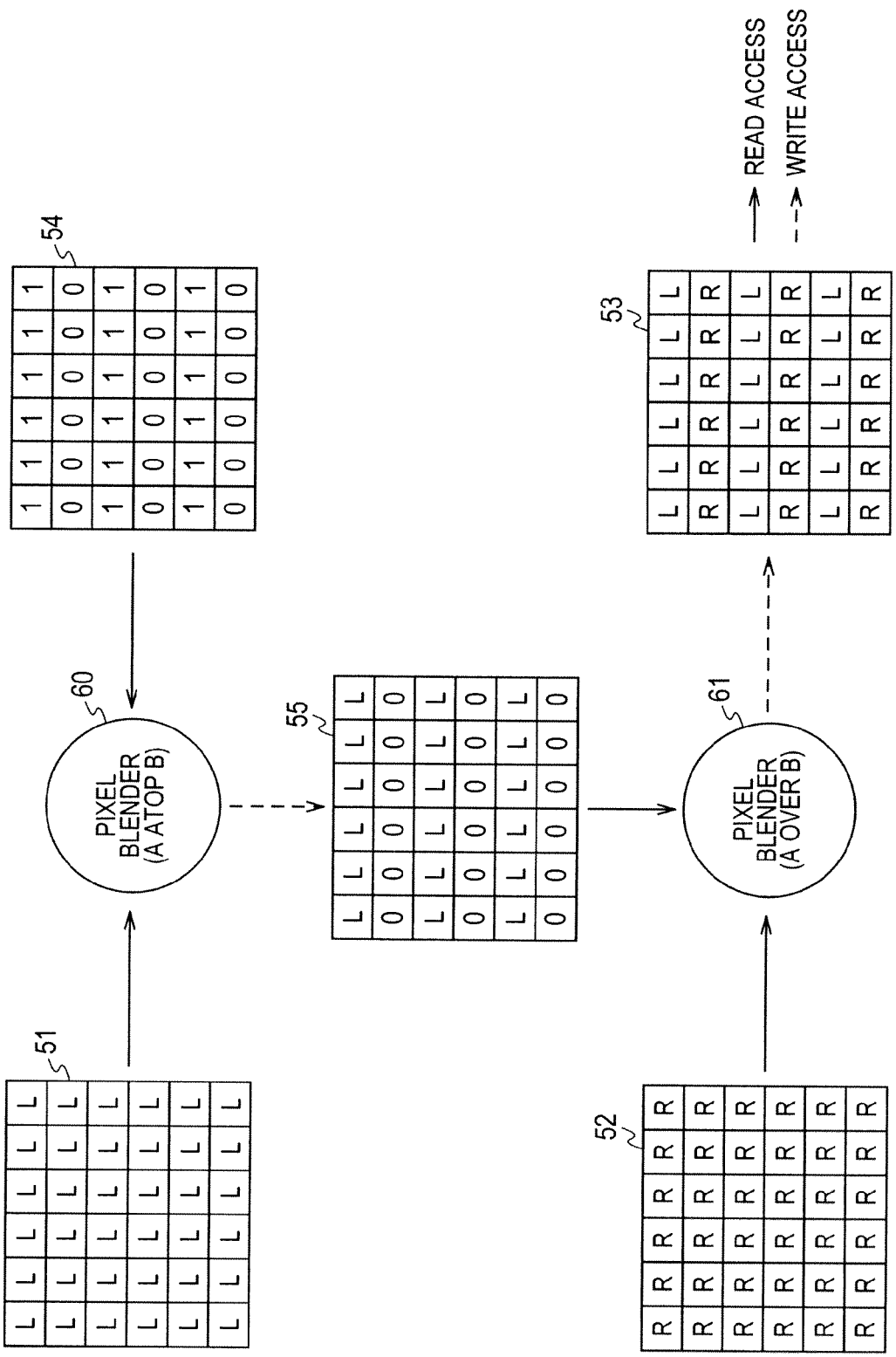
FIG. 15 is a diagram illustrating a method of generating a 3D stereoscopic image in a 3D television system described in US Patent Publication No. 2010/0302235.
Figure 16:
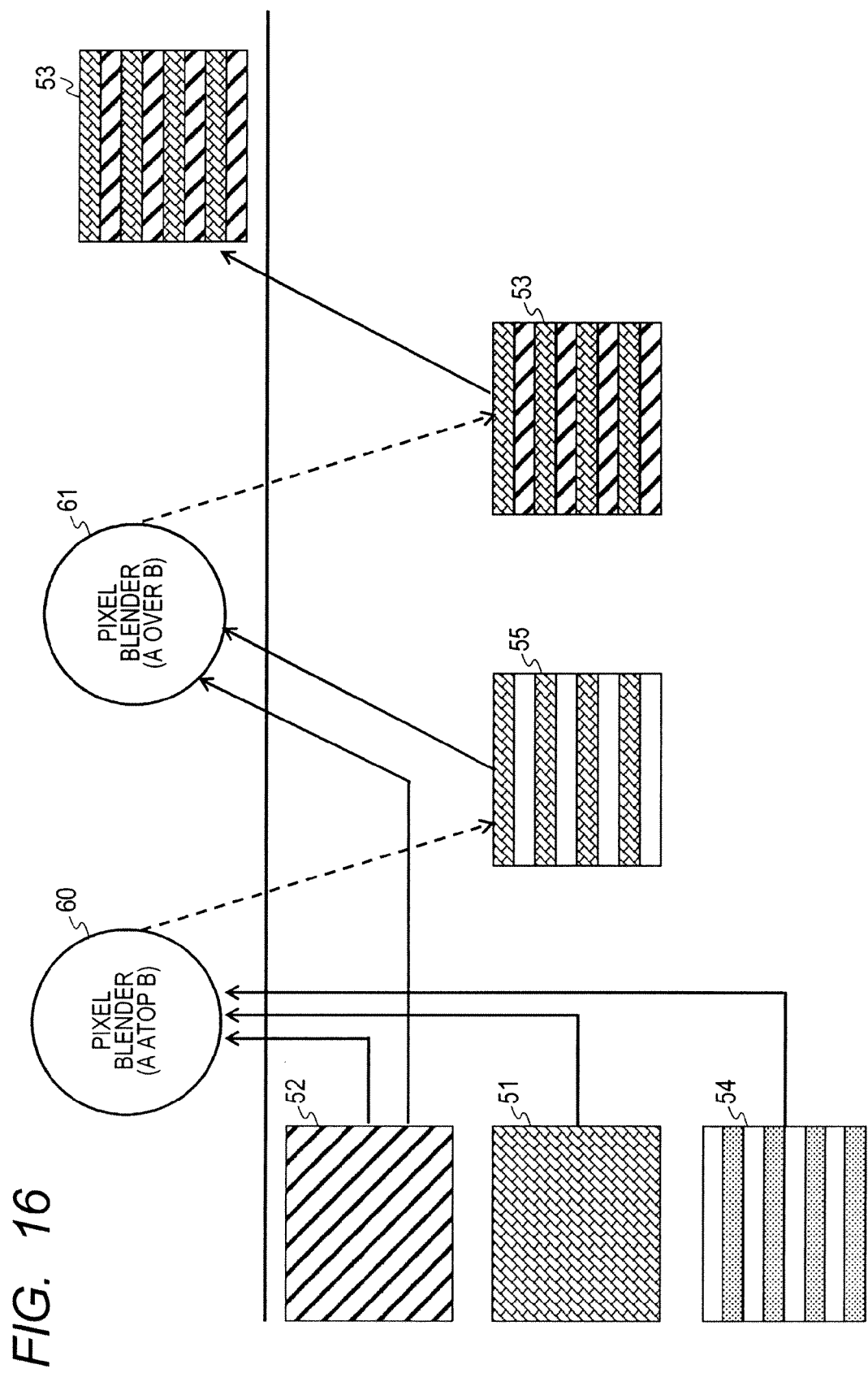
FIG. 16 is a diagram illustrating the relationship between each process and memory access (access to a storage device) that occurs when a method described in US Patent Publication No. 2010/0302235 is used.
Figure 17:
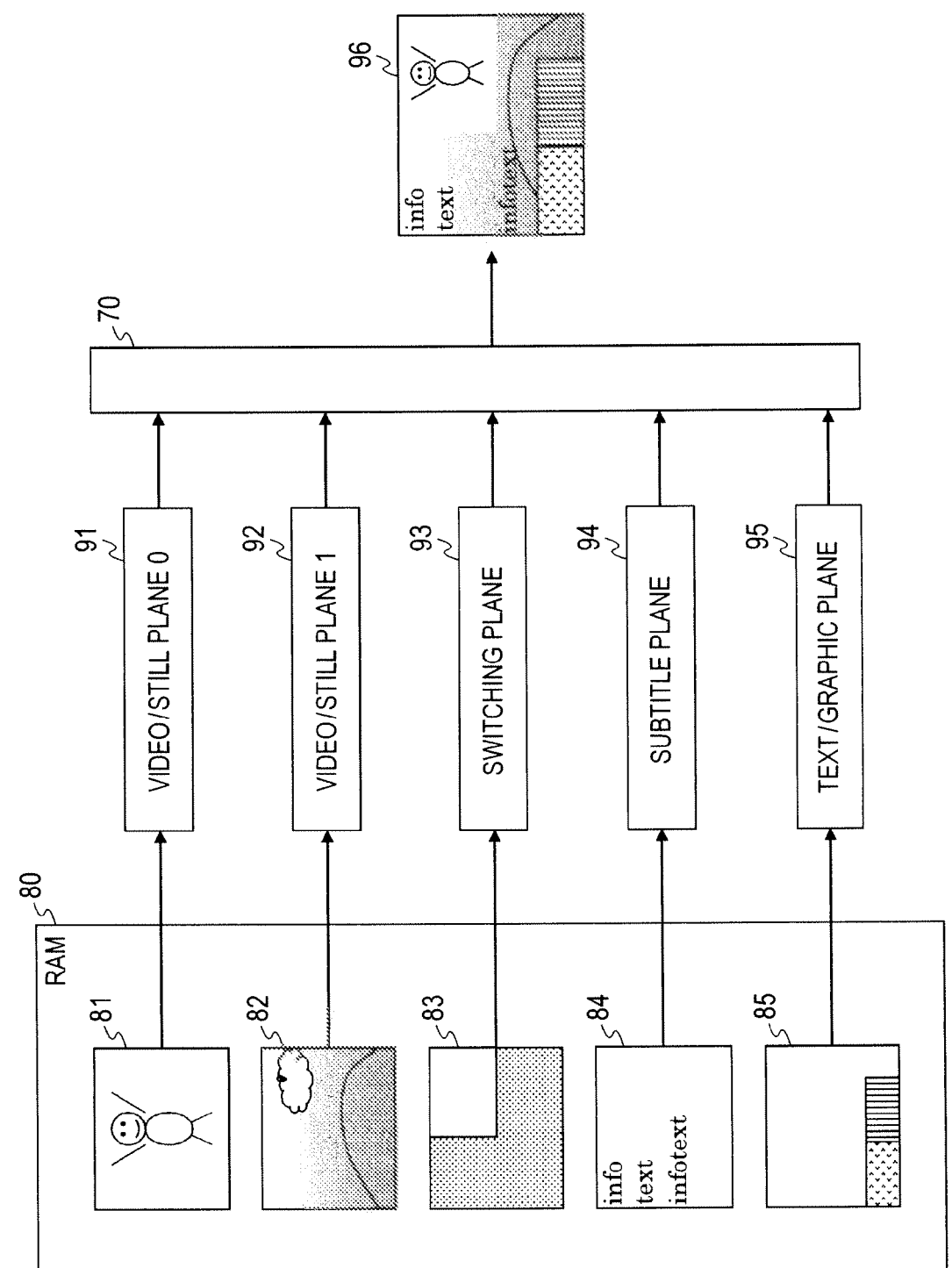
FIG. 17 is a diagram illustrating a plane synthesis technology described in "Data Broadcast Encoding Method and Transmission Method in Digital Broadcasting" (retrieved from the Internet on Apr. 10, 2011; URL: http//www.ari-b.or.jp/english/html/overview/doc/2-STD-B24v5_1-1p3.pdf).

A method of generating side-by-side image data when the image processing device 1 is configured as shown in FIG. 8 will now be described with reference to FIG. 14.

The first image data 21 is an image corresponding to the user's right eye. The data selection information 303 designates the entire region of the first image data 21 (sets the bit value "1" for all pixels). The display position information 305 designates the right half region of the output image data 24. The second image data 22 is an image corresponding to the user's left eye. The data selection information 313 designates the entire region of the second image data 22 (sets the bit value "1" for all pixels). The display position information 315 designates the left half region of the output image data 24. The display position information 325 and the display position information 335 are set so as not to select an image region (namely, the bit value "0" is set for all pixels). As regards the mask information 23, the bit value "0" is set for all pixels.

In accordance with the above input, the scale processing unit 30 rescales the first image data 21 to the right half of the data size of the output image data 24, and outputs the rescaled image to the mixer unit 101. The mixer unit 101 outputs the image whose right half is the first image data 21 to the mixer unit 101.

In accordance with the above input, the scale processing unit 31 rescales the second image data 22 to the left half of the data size of the output image data 24, and outputs the rescaled image to the mixer unit 102. Further, the scale processing unit 31 outputs the enable signal 317 to the enable signal processing unit 40 in accordance with the display position information 315.

As the bit value "0" is set for all pixels in the display position information 325, the scale processing unit 32 always outputs the bit value "0" to the enable signal processing unit 40 as the enable signal 327. Further, the scale processing unit 32 outputs the bit value "0" for all pixels to the enable signal processing unit 40 as the output image 326.

In accordance with the above input, the enable signal processing unit 40 generates an enable signal that provides the bit value "1" for pixels corresponding to the left half region of the output image data 24 and the bit value "0" for pixels corresponding to the right half region of the output image data 24, and outputs the generated enable signal to the mixer unit 102.

In accordance with the enable signal, the mixer unit 102 generates an image by setting the pixel value of the second image data 22 for each pixel in the left half region of the output image data 24 and setting the pixel value of the first image data 21 for each pixel in the right half region of the output image data 24, and outputs the generated imaged to the mixer unit 103.

As the bit value "0" is set for all pixels in the display position information 315, the scale processing unit 33 always outputs the bit value "0" as the enable signal 337.

As the bit value "0" is always supplied as the enable signal 337, the mixer unit 103 outputs the output of the mixer unit 102 on an "as is" basis. The image processing device 1 generates the output image data 24, which is a side-by-side image, by performing the above-described series of processes.

Advantages provided by the image processing device 1 according to the present embodiment will now be described. As described above, the image processing device 1 can generate an image plane-synthesized for digital broadcasting (FIG. 8) and a stereoscopic image (FIGS. 12 to 14) by changing the input data (first image data 21, second image data 22, mask information 23, etc.) and setup information (data selection information 303, display position information 305, etc.) as needed.

The mixer unit 101 and other processing units are capable of generating a stereoscopic image and achieving a plane synthesis for digital broadcasting. This eliminates the necessity of adding a dedicated processing unit for stereoscopic images and a dedicated processing unit for plane synthesis to the image processing device 1. This makes it possible to simplify and downsize the device and reduce its cost and its maintenance cost.

Further, the image processing device 1 can support side-by-side input image data and side-by-side output image data as described earlier by allowing the scale processing units 30, 31 to rescale the first image data 21 and the second image data 22.

The prevent invention is not limited to the foregoing embodiments, but extends to various modifications that nevertheless fall within the scope of the appended claims.

What is claimed is:

1. An image processing device comprising:
   a mixer unit that mixes a first image with a second image to generate an output image in accordance with first mask information, which defines a display region so that substantially a same number of pixels in the first and second images are displayed while the pixels are dispersed substantially uniformly,
   wherein the mixer unit includes:
     a calculation unit which reads a bit value from the first mask information on an individual pixel basis and calculates a first alpha blend value at a relevant coordinate based on the read bit value;
     a first multiplication unit which reads a pixel value at the relevant coordinate from the second image and calculates a first pixel value by multiplying the first alpha blend value by the read pixel value in the first image;
     a second multiplication unit which reads a pixel value at the relevant coordinate from the first image and calculates a second pixel value by multiplying a second alpha blend value by the read pixel value in the second image, the second alpha blend value being calculated based on the first alpha blend value; and
     an addition unit which sets a sum of the first pixel value and the second pixel value to be a pixel value at the relevant coordinate in the output image, and
   wherein the mixer unit generates the output image without generating an intermediate image.

2. The image processing device according to claim 1, wherein the first mask information is such that a first bit value indicating the display of the first image and a second bit value indicating the display of the second image are disposed in a vertical stripe pattern, in a horizontal stripe pattern, or in a checkered pattern.

3. The image processing device according to claim 1, wherein the mixer unit generates the output image by using either the first mask information or second mask information, a bit value array of the second mask information being displaced one bit from a bit value array of the first mask information.

4. The image processing device according to claim 3, wherein the mixer unit generates the output image by using the first mask information and the second mask information alternately at fixed intervals.

5. The image processing device according to claim 1, wherein, when the first mask information is input, the mixer unit generates the output image in accordance with the first mask information, and
wherein, when third mask information is input, the mixer unit generates the output image in accordance with the third mask information, the third mask information defining the display regions of a pixel in the first image and a pixel in the second image.

6. The image processing device according to claim 5, further comprising:
an enable signal processing unit that generates an enable signal in accordance with display target region information about the second image, the first mask information, and effective region information about the first mask information to specify whether the pixel value of the first image or the pixel value of the second image is to be set for each pixel in the output image, and supplies the generated enable signal to the mixer unit.

7. The image processing device according to claim 6, further comprising:
a first scale processing unit that cuts out a relevant region from the first image in accordance with display target region information about the first image, rescales the relevant region of the first image in accordance with scale information about the cut-out region, and supplies the resealed first image to the mixer unit; and
a second scale processing unit that cuts out a relevant region from the second image in accordance with the display target region information about the second image, rescales the relevant region of the second image in accordance with scale information about the cut-out region, and supplies the resealed second image to the mixer unit.

8. The image processing device according to claim 5, further comprising:
a second mixer unit that generates a composite image by superimposing a third image over the output image in accordance with display target region information about the third image.

9. The image processing device according to claim 1, further comprising:
a storage device that stores at least one of the first image, the second image, and the first mask information.

10. An image processing device comprising:
a mixer unit that mixes a first image with a second image to generate an output image in accordance with mask information defining display regions of the first and second images, display target region information about the first image, and display target region information about the second image,
wherein the mixer unit includes:
a calculation unit which reads a bit value from the first mask information on an individual pixel basis and calculates a first alpha blend value at a relevant coordinate based on the read bit value;
a first multiplication unit which reads a pixel value at the relevant coordinate from the second image and calculates a first pixel value by multiplying the first alpha blend value by the read pixel value in the first image;
a second multiplication unit which reads a pixel value at the relevant coordinate from the first image and calculates a second pixel value by multiplying a second alpha blend value by the read pixel value in the second image, the second alpha blend value being calculated based on the first alpha blend value; and
an addition unit which sets a sum of the first pixel value and the second pixel value to be a pixel value at the relevant coordinate in the output image, and
wherein the mixer unit generates the output image without generating an intermediate image.

11. The image processing device according to claim 10, further comprising:
an enable signal processing unit that generates an enable signal in accordance with the display target region information about the second image, the mask information, and effective region information about the mask information to specify whether a pixel value of the first image or a pixel value of the second image is to be set for each pixel in the output image, and supplies the generated enable signal to the mixer unit.

12. The image processing device according to claim 10, further comprising:
a first scale processing unit that cuts out a relevant region from the first image in accordance with the display target region information about the first image, rescales the relevant region of the first image in accordance with scale information about the cut-out region, and supplies the resealed first image to the mixer unit; and
a second scale processing unit that cuts out a relevant region from the second image in accordance with the display target region information about the second image, rescales the relevant region of the second image in accordance with scale information about the cut-out region, and supplies the resealed second image to the mixer unit.

13. The image processing device according to claim 1, further comprising:
a second mixer unit that generates a composite image by superimposing a third image over the output image in accordance with display target region information about the third image.

14. An image processing method comprising:
generating an output image without generating an intermediate image, comprising:
reading a bit value from the first mask information on an individual pixel basis and calculating a first alpha blend value at a relevant coordinate based on the read bit value;
reading a pixel value at the relevant coordinate from the second image and calculating a first pixel value by multiplying the first alpha blend value by the read pixel value in the first image;
reading a pixel value at the relevant coordinate from the first image and calculating a second pixel value by multiplying a second alpha blend value by the read pixel value in the second image, the second alpha blend value being calculated based on the first alpha blend value; and setting a sum of the first pixel value and the second pixel value to be a pixel value at the relevant coordinate in the output image.

15. An image processing method comprising:

in a mixer unit, generating an output image without generating an intermediate image, comprising::

reading a bit value from the first mask information on an individual pixel basis and calculating a first alpha blend value at a relevant coordinate based on the read bit value;

reading a pixel value at the relevant coordinate from the second image and calculating a first pixel value by multiplying the first alpha blend value by the read pixel value in the first image;

reading a pixel value at the relevant coordinate from the first image and calculating a second pixel value by multiplying a second alpha blend value by the read pixel value in the second image, the second alpha blend value being calculated based on the first alpha blend value; and setting a sum of the first pixel value and the second pixel value to be a pixel value at the relevant coordinate in the output image;

wherein the reading out of the pixel value from the first image comprises cutting out a relevant region from the first image in accordance with display target region information about the first image, resealing the relevant region of the first image in accordance with scale information about the cut-out region, and supplying the resealed first image to the mixer unit; and wherein the reading out of the pixel value from the second image comprises cutting out a relevant region from the second image in accordance with display target region information about the second image, resealing the relevant region of the second image in accordance with scale information about the cut-out region, and supplying the resealed second image to the mixer unit.

16. The image processing device according to claim 1, wherein the first image, the second image, and the first mask information are stored in a storage device, and wherein the calculation unit accesses the storage device to read the bit value from the first mask information, the first multiplication unit accesses the storage device to read the pixel value at the relevant coordinate from the second image, and the second multiplication unit accesses the storage device to read the pixel value at the relevant coordinate from the first image.

17. The image processing device according to claim 1, further comprising:

a subtraction unit which subtracts the first alpha blend value from 1 to generate the second alpha blend value, and supplies the second alpha blend value to the second multiplication unit.

18. The image processing device according to claim 17, further comprising:

an enable signal processing unit that generates an enable signal in accordance with display target region information about the second image, the first mask information, and effective region information about the first mask information to specify whether the pixel value of the first image or the pixel value of the second image is to be set for each pixel in the output image, and supplies the generated enable signal to the mixer unit;

a first scale processing unit that cuts out a relevant region from the first image in accordance with display target region information about the first image, rescales the relevant region of the first image in accordance with scale information about the cut-out region, and supplies the resealed first image to the mixer unit; and a second scale processing unit that cuts out a relevant region from the second image in accordance with the display target region information about the second image, rescales the relevant region of the second image in accordance with scale information about the cut-out region, and supplies the resealed second image to the mixer unit, wherein, when the first mask information is input, the mixer unit generates the output image in accordance with the first mask information, and wherein, when third mask information is input, the mixer unit generates the output image in accordance with the third mask information, the third mask information defining the display regions of a pixel in the first image and a pixel in the second image.

* * * * *